United States Patent [19]
Berke et al.

[11] Patent Number: 5,820,752
[45] Date of Patent: Oct. 13, 1998

[54] METHODS AND APPARATUS FOR RECYCLING USED ANTIFREEZE/COOLANT

[75] Inventors: Norman D. Berke, New Milford; Stephen M. Woodward, Lakeside; Aleksei V. Gershun, Oakville; Peter M. Woyciesjes, Woodbury, all of Conn.; Robert J. Rosvally, Peekskill, N.Y.

[73] Assignee: Prestone Products Corporation, Danbury, Conn.

[21] Appl. No.: 513,430

[22] Filed: Aug. 10, 1995

[51] Int. Cl.$^6$ .............................. B01D 36/00; C02F 1/52; C02F 1/74; C02F 9/00

[52] U.S. Cl. ...................... 210/221.2; 210/665; 210/669; 210/694; 210/712; 210/722; 210/723; 210/724; 210/726; 210/738; 210/98; 210/101; 210/143; 210/172; 210/257.1; 210/259; 210/266; 210/199; 210/205; 210/206; 210/202; 210/220; 210/258

[58] Field of Search ............................. 210/221.2, 221.1, 210/98, 101, 220, 143, 172, 257.1, 259, 202, 205, 206, 209, 295, 266, 199, 665, 669, 694, 712, 722, 738, 723, 724, 726

[56] References Cited

U.S. PATENT DOCUMENTS

| | | |
|---|---|---|
| 1,157,176 | 10/1915 | Owen . |
| 2,922,521 | 1/1960 | Schranz . |
| 3,012,672 | 12/1961 | Ziemer . |
| 3,732,320 | 5/1973 | Ford . |
| 4,118,582 | 10/1978 | Walker . |
| 4,294,697 | 10/1981 | Sawa . |
| 4,436,617 | 3/1984 | Moore . |
| 4,448,681 | 5/1984 | Ludke . |
| 4,572,786 | 2/1986 | Endo . |
| 4,585,561 | 4/1986 | Zlokarnik . |
| 4,791,890 | 12/1988 | Miles . |
| 4,793,403 | 12/1988 | Vataru . |
| 4,844,873 | 7/1989 | Lebon . |
| 4,946,595 | 8/1990 | Miller . |
| 5,223,144 | 6/1993 | Woyciesjes . |
| 5,422,008 | 6/1995 | Woyciesjes . |

FOREIGN PATENT DOCUMENTS 3312070 10/1984 Germany .

*Primary Examiner*—Thomas M. Lithgow
*Attorney, Agent, or Firm*—Cummings & Lockwood

[57] ABSTRACT

A recycling apparatus which preferably treats used antifreeze/coolant in four cycles is disclosed. The recycling apparatus includes a number of tanks for storing the antifreeze/coolant during the various treatment cycles, a number of containers for storing chemical reagents used to chemically treat the antifreeze/coolant and a number of filters used to capture impurities suspended in the treated antifreeze/coolant. During a fill cycle, the used antifreeze/coolant is introduced into a treatment tank and the concentration of the antifreeze/coolant is adjusted, if necessary, to a predefined range. During a mix cycle, the used antifreeze/coolant is mixed with various reagents to adjust the pH value, as well as to coagulate and flocculate the impurities. A reverse mixing and aspiration of the antifreeze/coolant in the tank during the mix cycle ensure that the reagents will mix well and react with the impurities in the used antifreeze/coolant to form a sludge. During a dormant cycle, the fluid in the tank is allowed to set, while the sludge is caused to rise to the top of the fluid. Finally, during a drain and filter cycle, the treated antifreeze/coolant is vacuum-drained from the treatment tank and is filtered and reinhibited before being stored in a storage tank. The treatment tank is preferably conically-shaped with a double step in its apex to assist the removal of sludge during the vacuum evacuation procedure.

11 Claims, 7 Drawing Sheets

METHODS AND APPARATUS FOR RECYCLING USED ANTIFREEZE/COOLANT

FIELD OF THE INVENTION

The present invention pertains to the recycling of used or spent antifreeze/coolant and, more particularly, to an apparatus which utilizes aspiration and reverse-flow mixing for improved treatment and restoration of used antifreeze/coolant in creating a recycled antifreeze/coolant product.

BACKGROUND OF THE INVENTION

In order to prevent over-heating, freeze-up or corrosion of an automobile engine and to maintain the efficient operation of the automobile's cooling system, the antifreeze/coolant contained in the cooling system should be relatively fresh and free of contaminants. Over time, however, the antifreeze/coolant will degrade, or break down, and become contaminated, for example, by dirt, rust, metal and wood, and thereby inhibit the efficient operation of the cooling system. The chemical break down of the used antifreeze/coolant is evidenced by the lowering of the pH value from an initial value of about 10.0 to a value as low as 7.0. Thus, in order to minimize corrosion to the engine's cooling system and to maintain efficient operation, the original equipment manufacturers (OEMs) recommend that used antifreeze/coolant must be periodically replaced.

It is no longer considered environmentally friendly, or economically sound, however, to merely discard the used antifreeze/coolant that is removed from the cooling systems of automobiles and other vehicles. Thus, due to an increased awareness of the potential environmental hazards of used antifreeze/coolant, as well the recognition that the supply of ethylene glycol is limited, attempts have been made to treat and restore the used antifreeze/coolant to provide a recycled antifreeze/coolant product which is suitable for reuse in the cooling system of an automobile or other vehicle.

The previous attempts to recycle or otherwise purify spent or used antifreeze/coolant are well known. For example, U.S. Pat. Nos. 3,732,320; 4,118,582; 4,791,890; 4,793,403; 4,946,595, 5,223,144 and 5,422,008 describe various processes for recycling and/or purifying used antifreeze/coolant. The techniques utilized in these recycling processes include the removal of contaminants, adjustment of the concentration and pH values of the spent antifreeze/coolant by adding fresh antifreeze/coolant; and the reinhibition of the purified antifreeze/coolant by the addition of corrosion inhibitors.

While the processes disclosed in these patents provide acceptable techniques for recycling used antifreeze/coolant, many problems still remain. One difficulty with any recycling process is that, in order to be economically feasible, the used antifreeze/coolant must be treated in batch quantities. Each batch of used antifreeze/coolant, however, will have a unique combination of impurities, pH values and concentration values, and will exhibit varying amounts of particulate matter and foreign materials.

In addition, many prior recycling techniques have exhibited unsatisfactory removal of solid contaminants, such as oil and bits of plastic, metal, stones, gravel, wood, paper and dirt, which tend to foul and clog the valves and orifices of the recycling machinery. A further troublesome problem has been the removal of suspended impurities and particulate matter, both of which often resist removal from the liquid, and do not always mix or react well with coagulant and flocculant agents.

Accordingly, a need exists for an improved system for purifying antifreeze/coolant, wherein most, if not all, of the problems associated with prior recycling processes and apparatus have been overcome. In particular, a need exists for an improved recycling apparatus, suitable for removing solid contaminants, as well as suspended impurities and particulate matter from the used antifreeze/coolant in order to produce an improved recycled antifreeze/coolant product.

SUMMARY OF THE INVENTION

Generally, in accordance with one aspect of the invention, an improved recycling apparatus is disclosed for refreshing used antifreeze/coolant. The recycling apparatus will preferably treat the used antifreeze/coolant in four stages or cycles. The recycling apparatus includes a number of tanks for storing the antifreeze/coolant during various stages of the treatment process, as well as a number of containers for storing chemical reagents which are used in various stages of the processes of the present invention to chemically treat or reinhibit the antifreeze/coolant. In addition, the antifreeze/coolant recycling apparatus includes a number of filters, such as a catch basin, preferably containing a polyester cloth filter, a paper filter, an activated-charcoal filter and an ion-exchange resin filter, which are used during a drain and filter cycle to capture impurities which are suspended in the treated antifreeze/coolant.

Each of the tanks, containers and filters in the recycling apparatus are preferably interconnected by a plurality of conduit branches. In order to isolate one or more of the tanks, containers or filters in each of the various stages of the treatment process as desired, a number of valves are preferably included in the conduit branches of the recycling apparatus. In a preferred embodiment, the valves are controlled by a microprocessor which allows a desired path through the recycling apparatus for a particular stage or cycle of the treatment process to be automatically established.

During the first stage of the treatment process, referred to as the fill cycle, the used antifreeze/coolant is introduced into a treatment tank and the concentration of the used antifreeze/coolant is adjusted, if necessary, to a predefined range. In the second stage, referred to as the mix cycle, the used or spent antifreeze/coolant is mixed in the treatment tank with various reagents to adjust the pH value, as well as to coagulate and flocculate the impurities and thereby form a sludge that tends to float to the top of the solution.

According to features of the invention, a reverse mixing and aspiration of the antifreeze/coolant in the tank during the mix cycle ensure that the reagents will mix well and react with the impurities in the used antifreeze/coolant to form a sludge. The introduction of properly-sized bubbles into the mixing fluid by an aspirator will assist the suspended particulates in rising to the top of the treatment tank. In addition, by introducing fluids into the treatment by means of the bottom of the tank, a reverse flow mixing is created which ensures a better mixing of the impurities with the coagulant and flocculant chemicals in the tank.

In a third stage of the process, referred to as the rest or dormant cycle, the fluid in the tank is allowed to set for a predefined period, while the sludge is caused to rise to the top of the fluid. During the fourth and final stage of the process, referred to as the drain and filter cycle, the treated antifreeze/coolant is vacuum-drained from the treatment tank and is filtered and reinhibited before being stored in a storage tank. According to further features of the invention, as the treated antifreeze/coolant is drained from the treatment tank, the sludge floating atop the liquid trails the purified antifreeze/coolant, and can be captured by a filter. In a preferred embodiment, the treatment tank is conically-shaped, and has at least a double step in its apex to ensure good mixing and assist in the removal of sludge during the vacuum evacuation procedure and achieve reasonable sizing of the tank. The shape of the treatment tank allows the treated impurities, now in the form of a viscous sludge, to sink easily to the bottom of the tank and be evacuated into the catch basin. It was discovered that it is beneficial to have the upper stage of the conical tank to have an angle of approximately 30° and the lower stage of the conical tank to have an angle of approximately 15°.

The recycling apparatus preferably includes a microprocessor that is programmed to automatically control the various cycles of the recycling process. The microprocessor is programmed to configure the valves in a desired manner to establish a desired path through the recycling apparatus for each particular cycle of the treatment process. In addition, the microprocessor is preferably programmed to control the operation of a pump, as desired, for each of the various treatment cycles.

According to yet another aspect of the invention, the recycling apparatus minimizes the use of valves and orifices, which normally trap pieces of foreign matter, such as bits of plastic, wood, paper, stone and metal, and tend to clog the conduits of the machinery. By using an anti-drain, pressurized feed system, wherein the tubing extends above the fill lines of the respective container, for introducing proper amounts of treating chemicals into the mixing tank the number of required valves was reduced.

A more complete understanding of the present invention, as well as further features and advantages of the invention, will be obtained by reference to the following Detailed Description with the accompanying drawings.

BRIEF DESCRIPTION OF THE DRAWINGS

For the sake of clarity and brevity, like elements and components will bear the same designation and numbering throughout the FIGURES.

DETAILED DESCRIPTION

Figure 1:
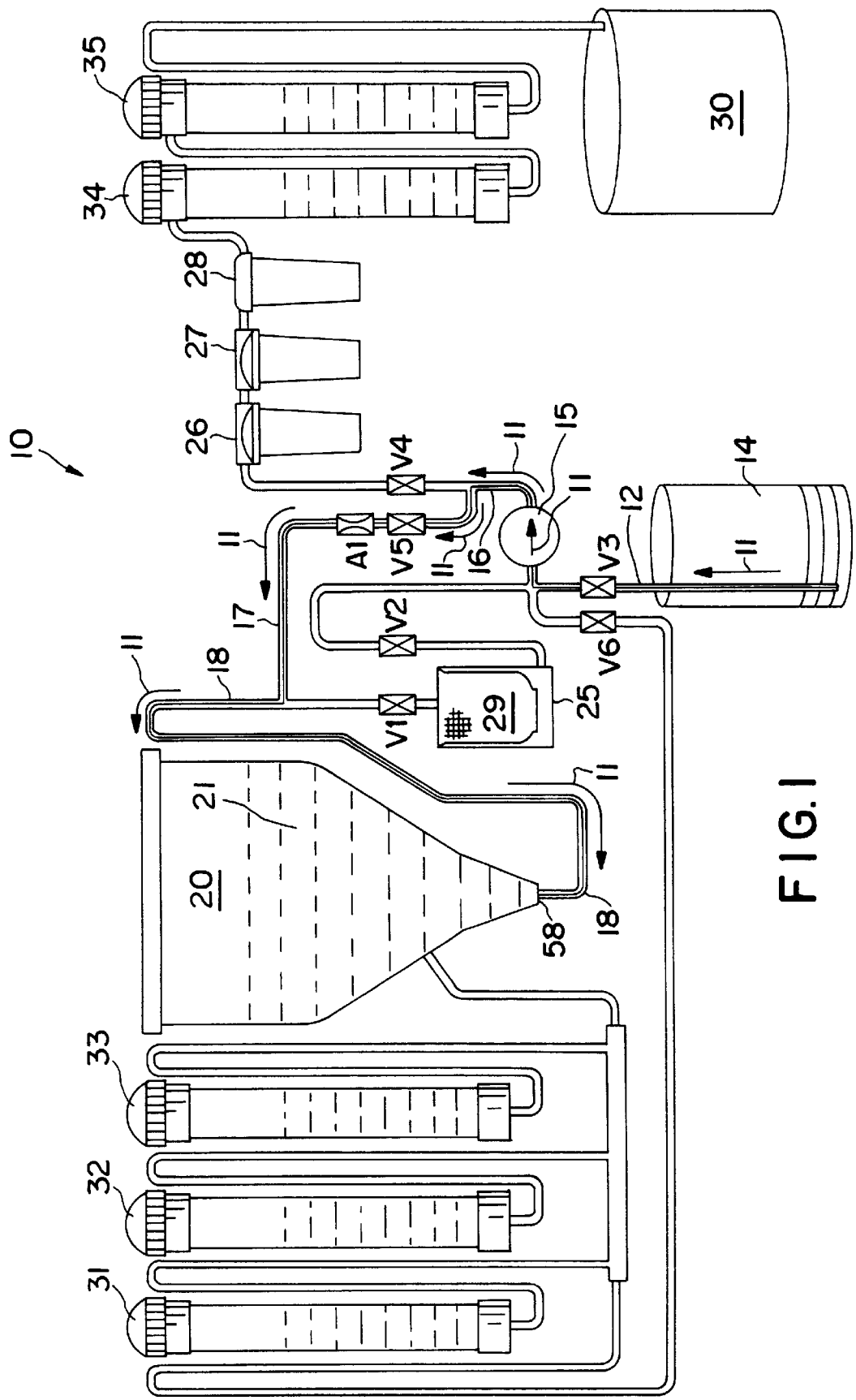
FIGS. 1 through 3 are schematic diagrams illustrating an antifreeze/coolant recycle apparatus according to the present invention, depicting the fill, mix, and drain and filter cycles, respectively.

An improved antifreeze/coolant recycling apparatus 10 in accordance with the present invention is shown in FIG. 1. Generally speaking, the recycling apparatus 10 will preferably treat the used antifreeze/coolant in four stages or cycles. In a first stage of the treatment, discussed below in a section entitled FILL CYCLE, the used or spent antifreeze/coolant is introduced into a treatment tank 20. During the fill cycle, the concentration of the used antifreeze/coolant is adjusted, if necessary, to a predefined range. In the second stage, discussed below in a section entitled MIX CYCLE, the used or spent antifreeze/coolant is mixed in the treatment tank 20 with various reagents to adjust the pH value, as well as to coagulate and flocculate the impurities. According to features of the invention, a reverse mixing and aspiration of the antifreeze/coolant in the tank 20 during the mix cycle ensure that the reagents will mix well and react with the impurities in the used antifreeze/coolant to form a sludge.

In a third stage of the process, referred to as the rest or dormant cycle, the fluid in the tank is allowed to set for a predefined period, while the sludge is caused to rise to the top of the fluid. During the fourth and final stage of the process, discussed below in a section entitled DRAIN AND FILTER CYCLE, the treated antifreeze/coolant is drained from the treatment tank 20 and is filtered and reinhibited before being stored in a storage tank 30. As the treated antifreeze/coolant is drained from the treatment tank 20, the sludge floating atop the liquid trails the purified antifreeze/coolant, in a manner described further below, and can be captured by a filter.

Figure 2:
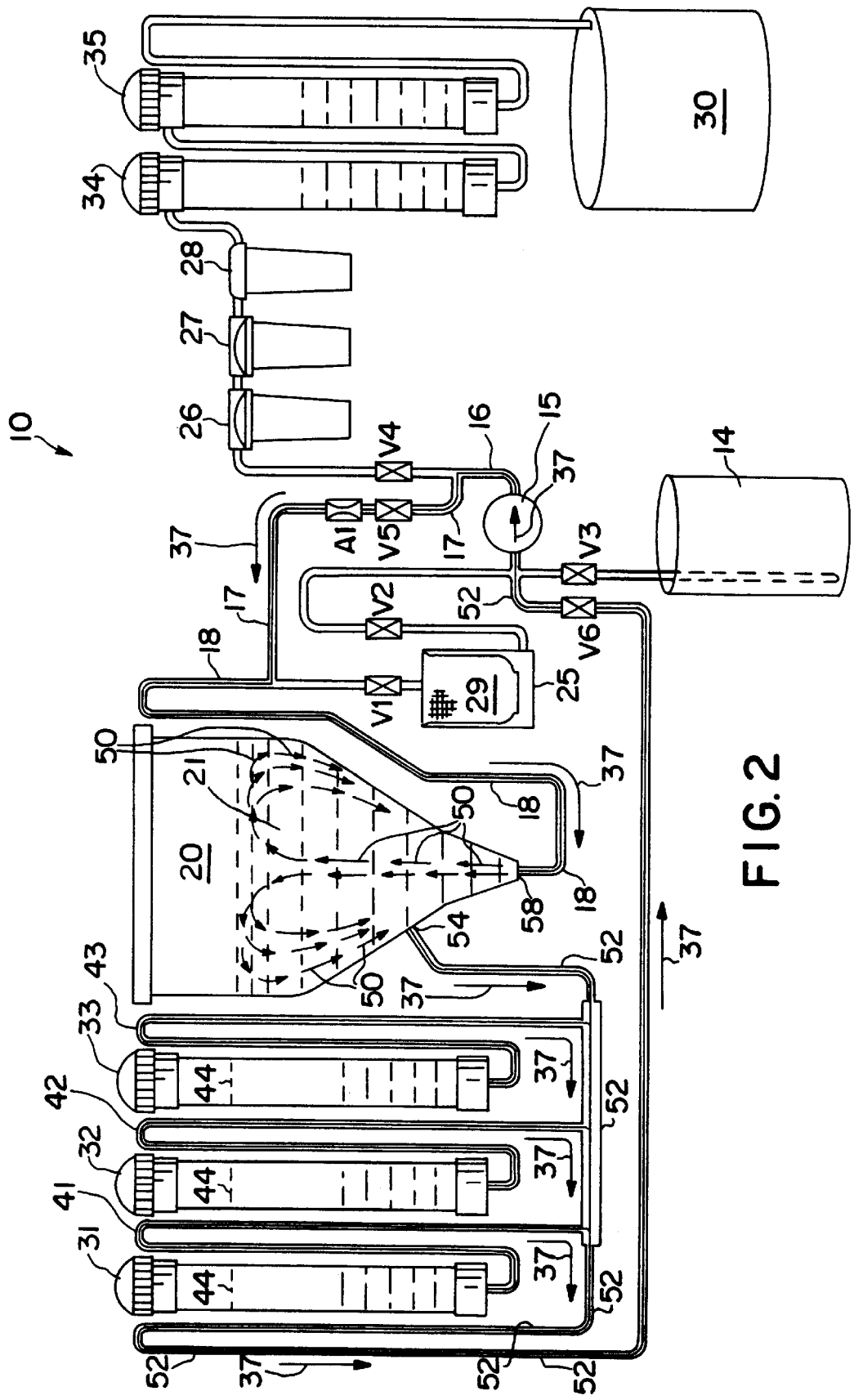
Figure 3:
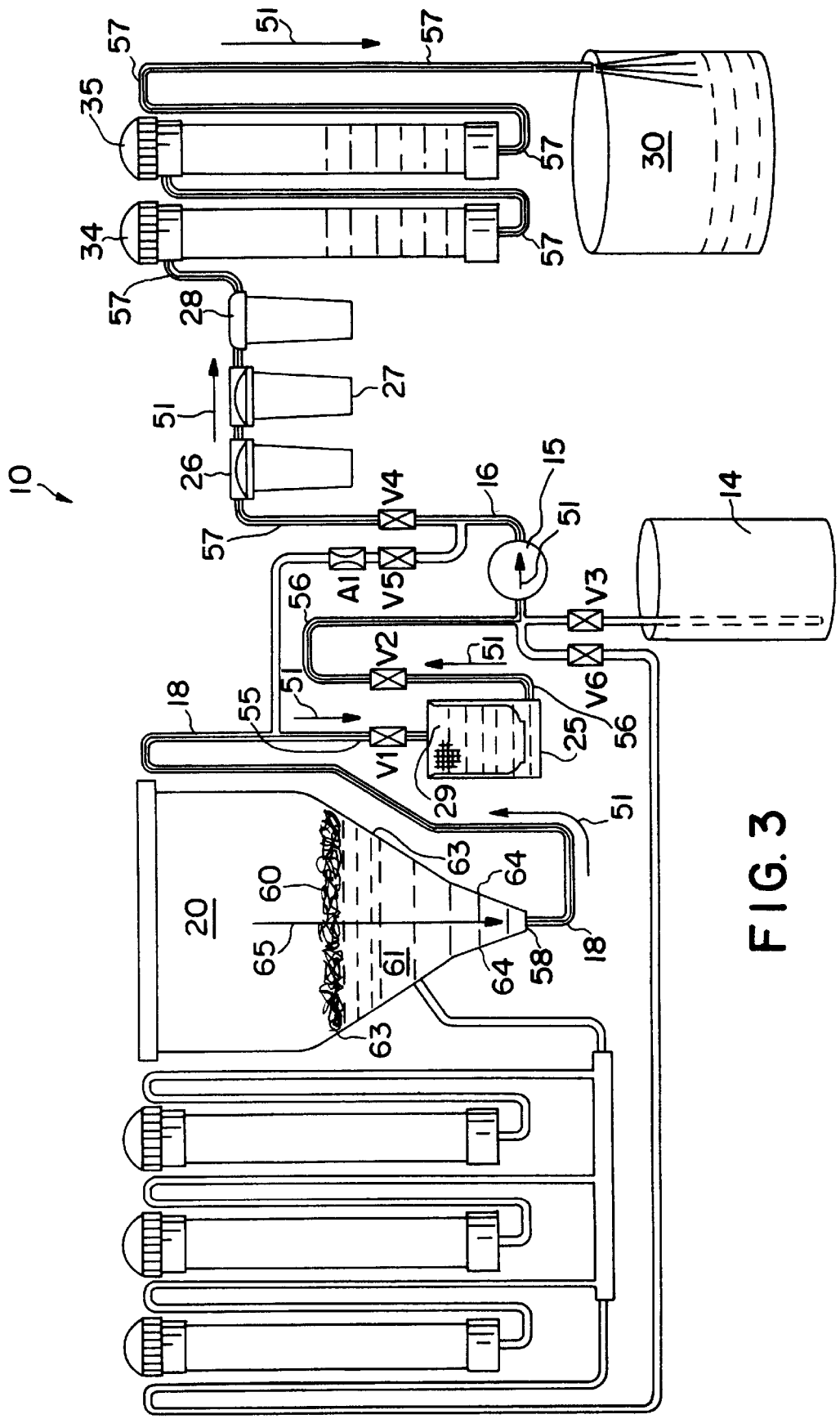

As shown in FIGS. 1 through 3, the recycling apparatus 10 includes a number of tanks 14, 20 and 30 for storing the antifreeze/coolant during various stages of the treatment process. In addition, the recycling apparatus 10 includes a number of containers 31–35 for storing a number of chemicals which are used in various stages of the processes of the present invention to chemically treat or reinhibit the antifreeze/coolant. As discussed below in conjunction with FIG. 2, containers 31 through 33 store chemical reagents used in the mixing cycle. In addition, containers 34 and 35 contain chemical reagents that are used to reinhibit the antifreeze/coolant during the drain and filter cycle, as discussed below in conjunction with FIG. 3.

In addition, the antifreeze/coolant recycling apparatus 10 includes a number of filters 26–29 which are used during the drain and filter cycle to capture impurities which are suspended in the treated antifreeze/coolant. As discussed below in conjunction with FIG. 3, the antifreeze/coolant recycling apparatus 10 preferably includes a catch basin 25, preferably containing a polyester cloth filter 29, a canister 26 containing a paper filter, a canister 27 containing an activated-charcoal filter and a canister 28 containing an ion-exchange resin.

As discussed further below, each of the tanks 14, 20 and 30, containers 31–35 and filters 26–29 in the recycling apparatus 10 are interconnected by a plurality of conduit branches, such as the branches 12, 16, 17, 18, 52 and 57. In order to isolate one or more tanks 14, 20 and 30, containers 31–35 or filters 26–29 in each of the various stages of the treatment process as desired, a number of valves V1–V6 are preferably included in the conduit branches of the recycling apparatus 10. In a preferred embodiment, discussed below in conjunction with FIG. 7, the valves V1–V6 are controlled by a microprocessor. In this manner, a desired path through the recycling apparatus 10 for a particular stage or cycle of the treatment process can be automatically established.

FILL CYCLE

As indicated above, the recycling apparatus 10 includes a batch container 14 for storing the spent or used antifreeze/coolant to be recycled. For example, the batch container 14 may store used antifreeze/coolant which has been drained from the cooling system of an automobile by a drain-and-fill apparatus, such as the drain-and-fill apparatus described in U.S. patent application Ser. No. 08/431,494, filed Feb. 13, 1995, entitled COOLING SYSTEM CHANGEOVER APPARATUS AND PROCESS, or United States patent application, filed contemporaneously herewith and entitled IMPROVED DRAIN-AND-FILL METHODS AND APPARATUS FOR AUTOMOTIVE COOLING SYSTEMS (Attorney Docket No. Pres-137). Each of these patent applications are assigned to the assignee of the present invention and are incorporated by reference herein.

During the fill cycle, the batch container 14 supplies the used antifreeze/coolant to the treatment tank 20 where the antifreeze/coolant will be processed in a manner described below. As shown in FIG. 1, the used antifreeze/coolant is fed through a number of conduit branches 12 and 16–18, as indicated by directional arrows 11. During the fill cycle, valves V3 and V5 are in an open position, while each of the remaining valves V1–V2, V4 and V6, are in a closed position. Thus, the used antifreeze/coolant is drawn up from the batch container 14 through conduit 12 and the open valve V3 by means of a pump 15. The pump 15 preferably operates under control of a microprocessor, as discussed below in conjunction with FIG. 7. The fluid will flow through conduit extension 16, through open valve V5 and into conduit branch 17.

As shown in FIG. 1, conduit branch 17 includes an aspirator A1 which will inject bubbles of a predefined size into the antifreeze/coolant travelling through the branch. As discussed further below in conjunction with FIG. 2, during the mixing cycle, the bubbles cause coagulated and flocculated impurities in the liquid to rise to the top of the liquid in the treatment tank 20. The aspirator A1 preferably operates under the control of a microprocessor, as discussed below in conjunction with FIG. 7. It is noted that the aspirator A1 need not be in an operational mode during the fill cycle. The antifreeze/coolant will thereafter continue through conduit branch 17 and into conduit branch 18 leading to the treatment tank 20. As previously indicated, the fluid follows the intended path designated by directional arrows 11 by virtue of the closed valves V1, V2, V4 and V6.

According to a feature of the present invention, the used antifreeze/coolant will enter the bottom 58 of the treatment tank 20 by means of the conduit branch 18, as shown in FIG. 1. The treatment tank 20 preferably has a predefined capacity, for example, 40 gallons. During the fill cycle, the treatment tank 20 is preferably initially not filled completely up to the capacity of the tank 20. In this manner, the concentration of antifreeze/coolant can be measured and adjusted, if necessary, to the desired concentration by adding additional antifreeze/coolant or water. In the illustrative embodiment, where the capacity of the treatment tank 20 is 40 gallons, the tank 20 is preferably initially filled with 30 gallons of used antifreeze/coolant Thereafter, the concentration of the used antifreeze/coolant 21 in the tank 20 is measured, for example, by measuring the optical refraction of the used antifreeze/coolant using a glycol and battery testing device, commercially available from Misco of Cleveland, Ohio. The preferred antifreeze/coolant concentration range is approximately 33% to 50% antifreeze/coolant, for example, ethylene or propylene glycol, by weight. In order to adjust the measured concentration of the used antifreeze/coolant to the desired value for processing, additional antifreeze/coolant or water may be added up to the capacity of the tank 20. The recycling apparatus 10 is preferably designed to process batches of used antifreeze/coolant in predefined quantities, such as the 40 gallon capacity of the tank 20. In this manner, the amount of chemicals stored in the various containers 31–35, discussed below, can be calibrated for the predefined batch capacity.

MIX CYCLE

FIG. 2 illustrates the recycling apparatus 10 configured for the mixing cycle. During the mixing cycle, valves V5 and V6 are placed in an open position by operation of the microprocessor (FIG. 7), while each of the remaining valves V1–V4 are placed in a closed position. Thus, the used antifreeze/coolant in the treatment tank 20 will flow through the conduit branches 16–18 and 52, as indicated by directional arrows 37, by means of the pump 15.

As discussed further below, a predefined and controlled amount of each of the chemical reagents in the reagent containers 31, 32 and 33 is preferably introduced into conduit 52 during the mixing cycle. In this manner, the reagents will flow through the conduit branches 52, and 16–18, as indicated by directional arrows 37, and be introduced into the bottom 58 of the treatment tank 20 through conduit branch 18. Container 31 preferably contains a reagent for adjusting the pH value of the antifreeze/coolant 21 within treatment tank 20. Container 32 preferably contains a coagulant for reacting with the impurities in the liquid 21 to form a heterogeneous mass. Container 33 preferably contains flocculant agents to cause the mass to fill with air and rise to the top of the liquid 20. Introduction of these reagents purifies the antifreeze/coolant in the treatment tank and effectively separates the impurities, such as iron, heavy metals, and metal oxides.

The amount of each reagent introduced into the treatment tank 20 from the containers 31–33 is dependent upon the predefined concentration value of the antifreeze/coolant specified in the first stage of the process. These amounts are generally preset in accordance with the predefined capacity of the treatment tank 20, with containers 31, 32 and 33 being respectively filled to their maximum preset levels 44. For a more detailed discussion of suitable chemical reagents and respective amounts of each chemical reagent to be added for various quantities of antifreeze/coolant to be treated, see U.S. Pat. No. 5,223,144, assigned to the assignee of the present invention and incorporated by reference herein.

As indicated above, during the mixing cycle, the antifreeze/coolant circulates through the conduit branches 16–18 and 52 and enters the bottom 58 of the treatment tank 20. Thus, according to a feature of the present invention, the flow that is introduced at the bottom 58 of the treatment tank 20 is a reverse mixing flow, causing the fluids to flow upwardly through the center of the treatment tank 20 and then down the sides, fountain-like, as shown by the directional arrows 50 in FIG. 2. The fluid is recirculated through conduits 52, 16, 17 and 18, after leaving the treatment tank through an exit orifice 54. As shown in FIG. 2, the exit orifice 54 is preferably positioned on the upper stage 63 of the double-step treatment tank 20. The reverse-flow mixing results in a turbulent flow pattern within the treatment tank 20, allowing the reagents to mix thoroughly with the antifreeze/coolant 21 disposed therein.

As previously indicated, according to a further feature of the present invention, conduit branch 17 includes an aspirator A1 for injecting bubbles of a predefined size into the antifreeze/coolant travelling through the branch during the mixing cycle. In one embodiment, the microprocessor (FIG. 7) will cause the aspirator A1 to be in an operational mode during the mixing cycle by opening a pneumatic solenoid 115 which controls the flow of air from an air supply 105 to the aspirator A1. The bubbles injected into the antifreeze/coolant by the aspirator A1 will facilitate the rising of the coagulated and flocculated impurities in the antifreeze/coolant in the treatment tank 20.

It has been found that if the size of the air bubbles injected into the antifreeze/coolant by the aspirator A1 is to large or too fine, the flocculated mass will not rise easily to the top of the liquid during the dormant cycle. A suitable bubble size has been evidenced when the aspirator A1 introduces the bubbles through a metering valve 112, such as an orifice having a diameter of approximately 0.010 inches, at an air pressure of approximately 7 psi, regulated, for example, by an air pressure regulator 110.

As indicated above, the pump 15 preferably operates under control of a microprocessor, discussed below in conjunction with FIG. 7. In a preferred embodiment, the pump 15 is utilized during the mixing cycle to maintain a specific flow rate in the recirculating fluid. It has been observed that it is not preferred to pass the treated antifreeze/coolant and impurities through a high shear mechanical pump, which tends to form particles of smaller size by mechanical shearing and thus makes it more difficult to remove particles with large size filters. Accordingly, it has been found that it is preferred to place a pumping means after the catch basin 25. Representative of high shear pumps is a MOYNO SP Pump, commercially available from Robbins & Wyers, Inc., and representative of a low shear pump is a Twin Diaphragm Pump, commercially available from the ARO Corporation.

As indicated above, the amount of each chemical reagent dispensed from each container 31–33 during the mixing cycle is preferably controlled and predefined. In order to ensure that the reagents contained in containers 31–33 do not completely drain into the treatment tank 20 via conduit branch 52, each of the containers 31–33 are connected to the conduit branch 52 by means of anti-drain lines 41–43, respectively. The anti-drain lines 41–43 extend above the maximum fluid level 44 in each of the containers 31–33, as illustrated, thereby preventing the uncontrolled draining of the reagents from their respective containers 31–33. It was discovered that a requirement of the chemical feed system is to allow for unobstructed passage of any solid material that may be present.

In addition, in order to dispense at the proper rate each chemical reagent into the conduit branch 52, a regulated air flow is applied to the top of each container 31, which will force the chemical reagents contained in each container through the respective anti-drain lines 41–43. In one embodiment, shown in FIG. 2, the microprocessor will cause an air pressure to be applied by opening a pneumatic solenoid 125 which controls the flow of air from an air supply 105. In addition, the rate of each chemical reagent that is dispensed is regulated by introducing the air flow through one or more metering valves 120, such as an orifice having a diameter of approximately 0.020 inches, at an air pressure of approximately 7 psi, regulated, for example, by one or more air pressure regulators 118.

In an alternate embodiment, a combination of fitting inside diameters and tubing length on the exit side of the reagent containers 31–33 along with controlling the incoming air flow, can regulate the amount of each chemical reagent introduced to the conduit branch 52 while maintaining acceptable size flow passages.

DORMANT CYCLE

After the mixing operation has been performed for a sufficient time, for example, approximately 4 minutes, the pumping ceases, and the system is allowed to rest. The bubbles which were injected into the antifreeze/coolant during the mixing cycle will cause the coagulated and flocculated mass 60, best seen in FIG. 3, to rise to the top of the liquid 21, thus leaving the purified antifreeze/coolant liquid 61 disposed below.

DRAIN AND FILTER CYCLE

FIG. 3 illustrates the recycling apparatus 10 configured for the drain and filter cycle. As indicated above, during the dormant cycle, the mass of impurities 60 in the treated antifreeze/coolant will form a sludge that rises to the top of the purified antifreeze/coolant liquid 61. During the drain and filter cycle, valves V1, V2 and V4 are placed in an open position, while each of the remaining valves V3, V5 and V6 are placed in a closed position. Thus, the treated antifreeze/coolant 61 in the treatment tank 20 will flow through conduit branches 16, 18, and 55–57, as indicated by directional arrows 51, by means of pump 15.

When pump 15 is restarted during the drain and filter cycle, by means of the microprocessor (FIG. 7), a vacuum, such as 7–10 millimeters of mercury, is created within conduit branches 18, 55 and 56. This vacuum causes the treated antifreeze/coolant 61 within treatment tank 20 to discharge through the bottom 58 of the tank 20, as indicated by directional arrow 65, with the sludge 60 trailing behind and sliding down the walls 63 of treatment tank 20.

According to a further feature of the invention, the treatment tank 20 is configured to facilitate the evacuation of the treated antifreeze/coolant 61 during the drain and filter cycle. As shown in FIG. 2, the treatment tank 20 features a conical vessel, having at least a double step in its apex. The resultant relatively steep, double angle construction of the wall 63 of the treatment tank 20 facilitates the complete drainage of the sludge 60 from the tank 20. The second, more steeply-angled cone step 64 designed into the tank 20 maximizes the forces of gravity which will assist the pump 15 in pulling the sludge mass through the bottom 58 of the treatment tank 20. More specifically, the double step construction of the treatment tank 20 creates a steeper angle, preventing "bridging" or an "air-hole" from being pulled through the sludge. It was discovered that it is beneficial to have the upper stage 63 of the conical tank to have an angle of approximately 30° and the lower stage 64 of the conical tank to have an angle of approximately 15°.

The draining liquid 61 and the sludge mass 60 are then piped through conduit branches 18 and 55 into a catch basin 25. The catch basin 25 preferably contains a polyester cloth bag filter 29. As is well-known, the draining liquid 61 will be drawn by gravity through the bag filter 29 into conduit branch 56, while the sludge mass 60 will be entrapped in the bag filter 29. The preferred ratio of the batch size to the volume of the bag filter 29 is between 5:1 and 6.65:1.

The liquid 61 is then pumped by pump 15 from the catch basin 25 through branch conduits 56, 16, 57. The liquid 61 passes through a paper filter in canister 26, an activated-charcoal filter in canister 27 and an ion-exchange resin in canister 28. For a more detailed discussion of filters 26–28, see U.S. Pat. No. 5,223,144, incorporated by reference above.

The liquid 61 is thereafter reinhibited by the inhibitors disposed in containers 34 and 35, respectively. In the illustrative embodiment, where the antifreeze/coolant is treated in batches of 40 gallons, container 34 preferably contains 1892 milliliters of RE4ASPX reinhibitor and container 35 preferably contains 1892 milliliters of RE5ASPX reinhibitor, assuming that the glycol concentration is 50%. For a more detailed discussion of suitable inhibitors for reinhibiting the treated antifreeze/coolant, see U.S. Pat. No 5,422,008, assigned to the assignee of the present invention and incorporated by reference herein. Following reinhibition, the treated liquid is then stored in a storage tank 30.

Figure 4:
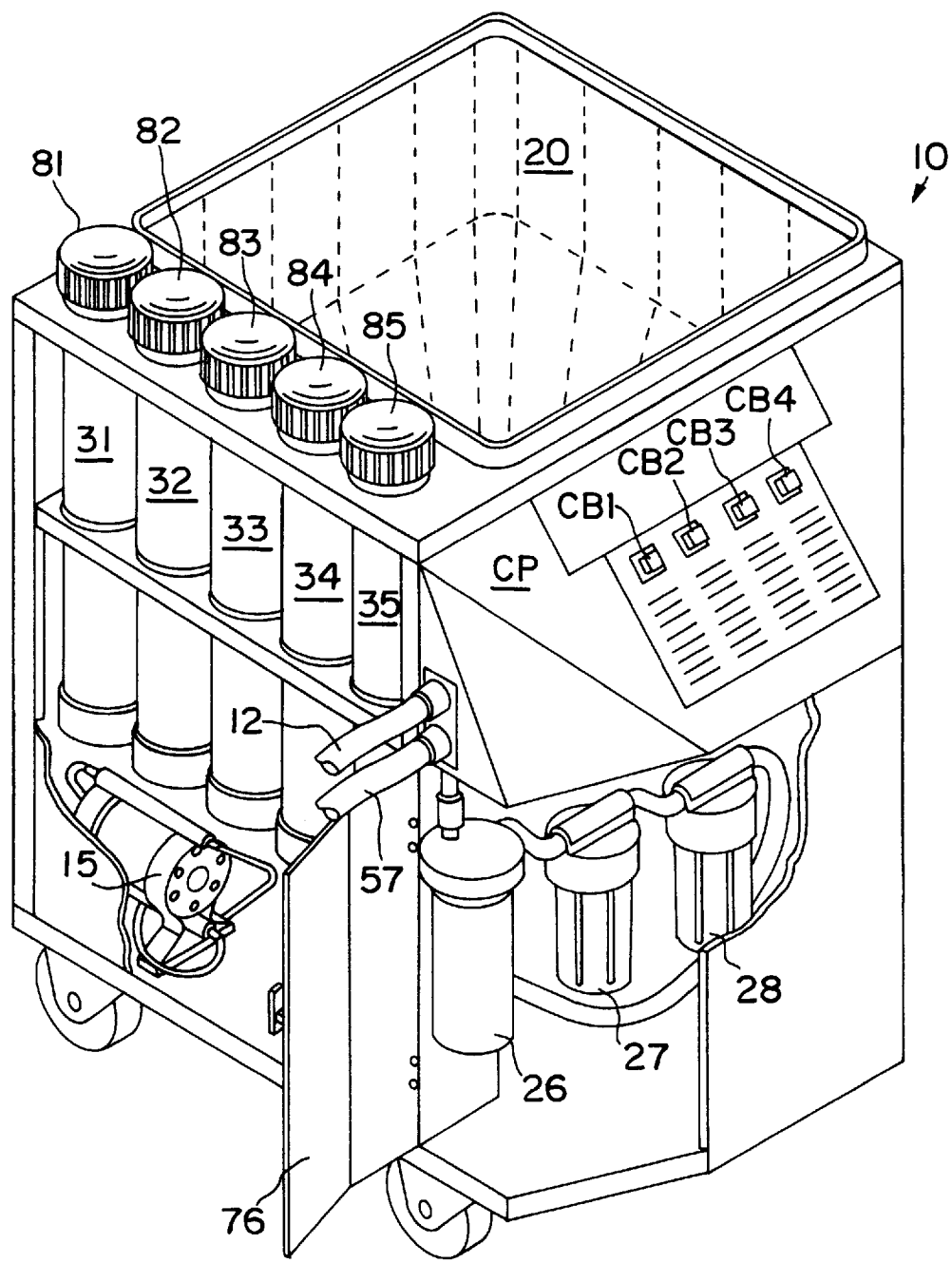
FIGS. 4 and 5 are perspective, partially cut-away, front views of the apparatus illustrated in FIGS. 1 through 3.
Figure 5:
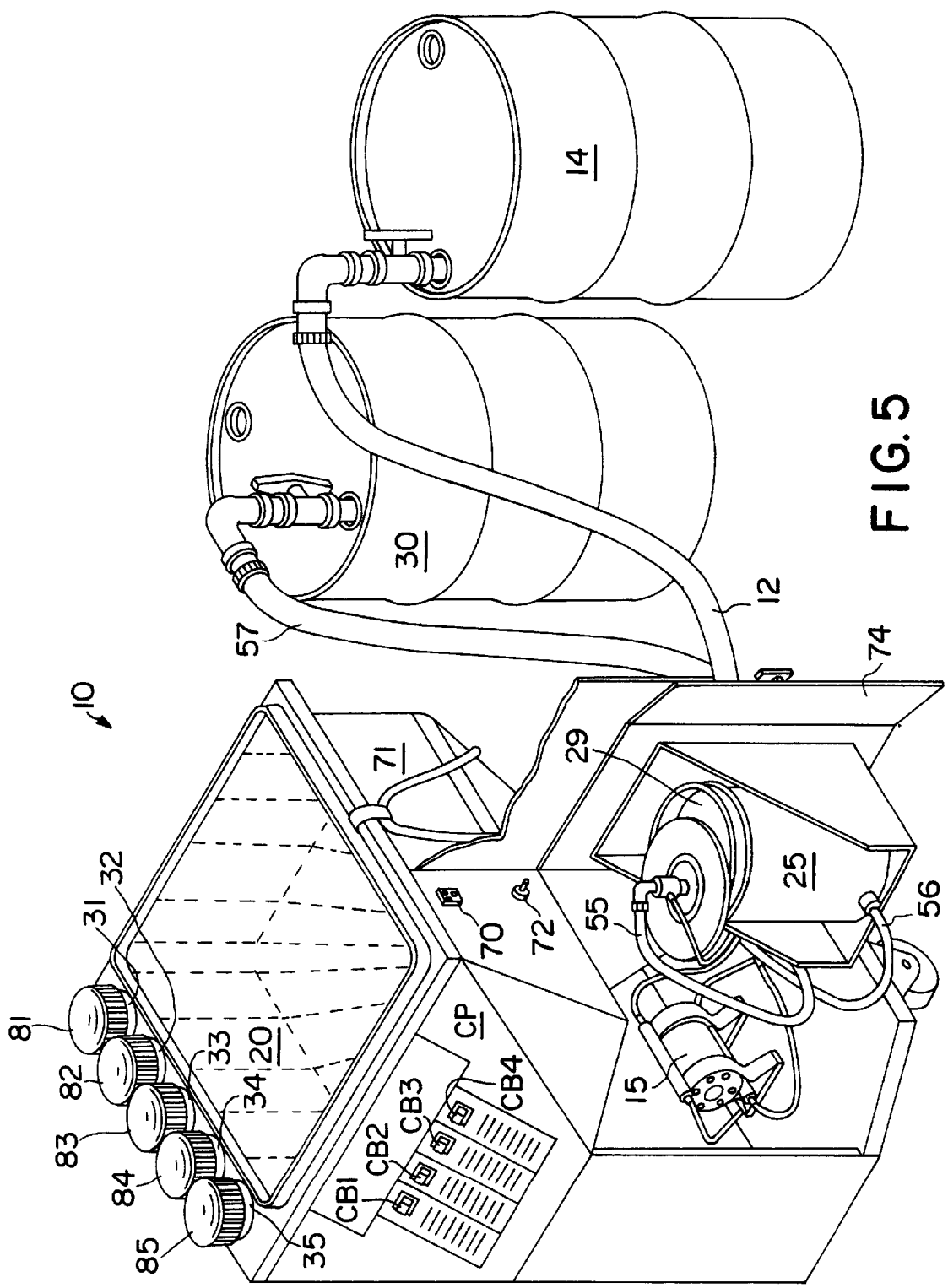
Figure 6:
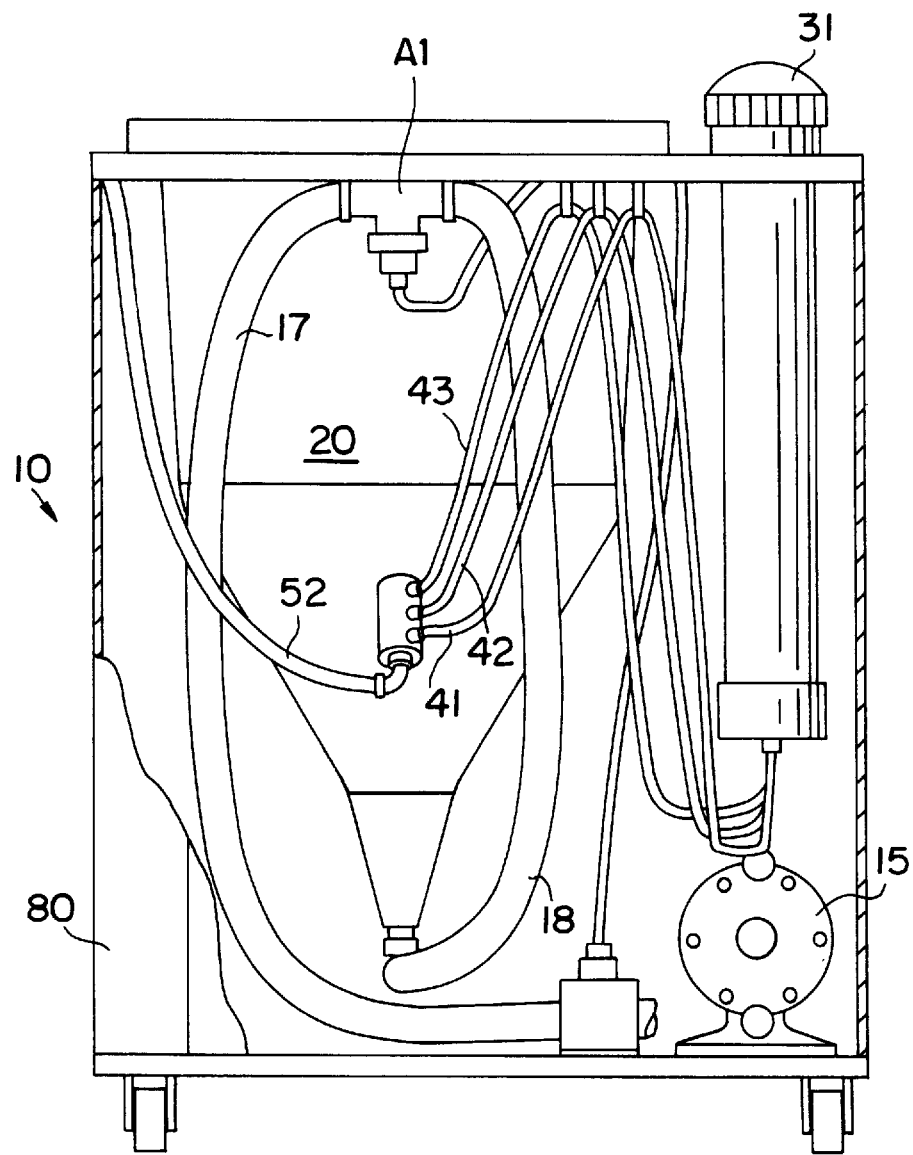
FIG. 6 is a cut-away, rear view of the apparatus shown in FIGS. 4 and 5.

Various schematic views of one embodiment of the recycling apparatus 10 are shown in FIGS. 4 through 6. FIGS. 4 and 5 illustrate the recycling apparatus 10 in partially elevated front cut-away views, while FIG. 6 depicts a cut-away, rear view of the recycling apparatus 10.

As shown in FIGS. 4 and 5, the recycling apparatus 10 preferably includes a control panel CP, featuring four push-button selector cycle buttons CB 1, CB2, CB3 and CB4, respectively. Selector buttons CB 1 through CB3 preferably allow an operator to manually operate the recycling apparatus 10. In one embodiment, selector button CB 1 actuates the fill cycle, in which the treatment tank 20 is filled with spent antifreeze/coolant from batch container 14 to the 30-gallon mark. After the concentration value has been determined, the selector fill button CB 1 is pressed again to adjust the level in tank 20 to the 40-gallon level by the addition of antifreeze/coolant or water for adjustment to a workable treatment range.

Selector button CB2 preferably activates the mixing cycle, wherein the various reagents from containers 31 through 33 are mixed with the spent antifreeze/coolant for a given period of time. The selector button CB3 initiates the drain and filter cycle, which is preferably activated after a sufficient dormant period follows the mixing cycle. In addition, a selector cycle button, CB4, preferably allows the operator to choose an automatic mode of operation. When the automatic mode selector button CB4 is activated, the recycling apparatus 10 will preferably automatically cycle through the various fill, mix, dormant and drain and filter cycles.

As shown in FIG. 5, the catch basin 25 is preferably mounted upon a hinged door panel 74 for ease of access, in order to provide a means by which the cloth filter 29 can be periodically cleaned or changed. In addition, the paper filter canister 26 is preferably mounted on a hinged door panel 76 for ease of access, as shown in FIG. 4, in order to provide a means by which the paper filter can be periodically replaced. In the illustrative embodiment, the door panel 76 also allows access to the canisters 27 and 28, respectively, for periodic maintenance. A back panel 80, shown in FIG. 6, may also be constructed as a removable panel in order to provide access to any of the various conduit branches, pump 15 or aspirator A1.

Figure 7:
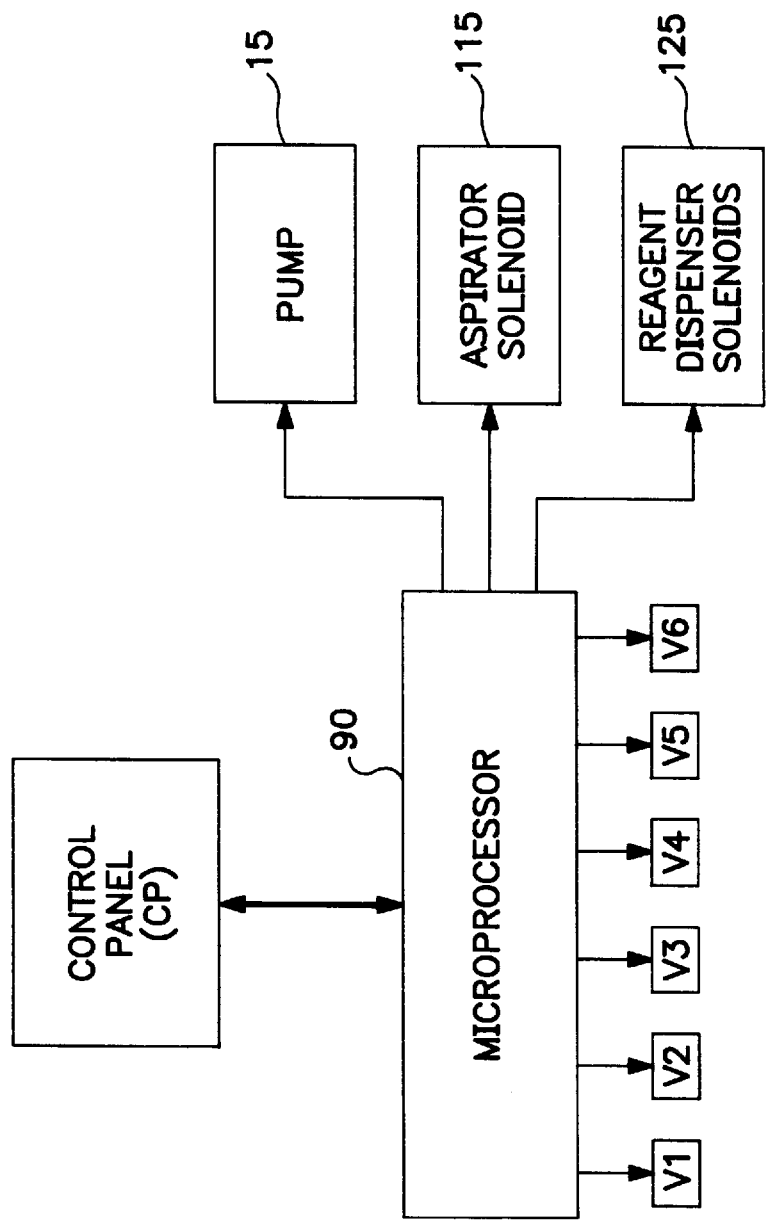
FIG. 7 is an electrical schematic diagram of an illustrative processing system of the invention shown in FIGS. 1 through 3.

As shown in FIG. 7, the selector buttons CB1–CB4 are connected to the microprocessor 90, in order to select and initiate a mode of operation. In one embodiment, the microprocessor 90 is programmed to configure the valves V1–V6 in a desired manner to establish a desired path through the recycling apparatus 10 for each particular cycle of the treatment process. In addition, the microprocessor 90 is preferably programmed to control the operation of the pump 15, as desired, for each of the various treatment cycles. For example, the microprocessor 90 should be programmed to disengage the operation of the pump 15 during the dormant cycle. Finally, the microprocessor 90 is preferably programmed to place the various solenoids 115 and 125 which control the air flow to the aspirator A1 and reagent containers 31–33, respectively, in an on position at the appropriate times during the mixing cycle, and in the off position at all other times. Of course, the microprocessor 90 could be implemented as a microcontroller which can be custom-designed to control the various valves V1–V6, pump 15 and solenoids 115, 125 in performing each of the required functions, as would be apparent to a person of ordinary skill in the art.

It is to be understood that the embodiments and variations shown and described herein are illustrative of the principles of this invention only and that various modifications may be implemented by those skilled in the art without departing from the scope and spirit of the invention.

We claim:

1. An apparatus for recycling used antifreeze/coolant, said apparatus comprising:

a treatment tank for treating a given quantity of used antifreeze/coolant, said treatment tank being filled and discharged through a bottom section thereof and having side walls which contain at least two steps for facilitating the drainage of impurities from the tank during a drain cycle;

control means operatively connected to said treatment tank for filling and discharging quantities of antifreeze/coolant into and from said treatment tank;

a plurality of reagent containers, each having a quantity of reagent for mixing with and treating impurities contained in said used antifreeze/coolant, said reagent containers each operatively connected to said treatment tank;

aspirating means operatively connected to said treatment tank and said control means for aspirating air into said used antifreeze/coolant in order to cause separation of said treated impurities from said antifreeze/coolant in said treatment tank; and separation means operatively connected to said treatment tank for trapping said treated impurities in said antifreeze/coolant discharged therefrom during said drain cycle, said separation means comprising a catch basin containing a filter for separating said impurities from said antifreeze/coolant.

2. The apparatus according to claim 1, wherein said control means comprises pumping means operatively connected to said treatment tank, said aspirating means and said plurality of reagent containers for providing flow of fluids throughout said apparatus.

3. The apparatus according to claim 1, wherein said control means comprises a plurality of valves disposed throughout said apparatus and operatively connected to said treatment tank, said aspirating means and said plurality of reagent containers, with different ones of said plurality of valves being open during one or more treatment cycles.

4. The apparatus according to claim 3, wherein said control means comprises a microprocessor for controlling said plurality of valves.

5. The apparatus according to claim 2, wherein said control means comprises a microprocessor for controlling said pumping means and said aspirating means.

6. The apparatus according to claim 1, further comprising storage means operatively connected to said treatment tank for storing refreshed antifreeze/coolant.

7. The apparatus according to claim 1, wherein said treatment tank is conically-shaped having an apex with at least two steps.

8. The apparatus according to claim 7, wherein an upper step has an angle of approximately 30° and a lower step has an angle of approximately 15°.

9. The apparatus according to claim 1, wherein the filling of said treatment tank through said bottom section of said treatment tank creates a reverse-flow mixing.

10. The apparatus according to claim 1, wherein said control means fills and discharges said treatment tank through a bottom portion thereof to create a reverse-flow mixing.

11. The apparatus according to claim 1, wherein said reagent containers are operatively connected to said treatment tank via anti-drain means, wherein reagent flows to said treatment tank only while under a given flow pressure.

* * * * *